United States Patent [19]
Bitsch et al.

[11] Patent Number: 5,188,478
[45] Date of Patent: Feb. 23, 1993

[54] FORCE-TRANSMITTING, CONE-SHAPED PRESS-FIT CONNECTION

[75] Inventors: Harald Bitsch, Witten; Heinz Schmidt, Dortmund, both of Fed. Rep. of Germany

[73] Assignee: Mannesmann Aktiengesellschaft, Düsseldorf, Fed. Rep. of Germany

[21] Appl. No.: 572,014

[22] Filed: Aug. 23, 1990

[30] Foreign Application Priority Data

Aug. 24, 1989 [DE] Fed. Rep. of Germany ....... 3928438
Jan. 17, 1990 [DE] Fed. Rep. of Germany ....... 4001659

[51] Int. Cl.⁵ ............................................. B25G 3/34
[52] U.S. Cl. ..................... 403/267; 403/266; 403/334
[58] Field of Search .................. 403/15, 334, 267, 265, 403/266

[56] References Cited

U.S. PATENT DOCUMENTS

| | | | |
|---|---|---|---|
| 3,898,010 | 8/1975 | Jungbluth et al. | 403/15 |
| 4,648,616 | 3/1987 | Diekman et al. | 403/265 X |
| 4,915,536 | 4/1990 | Bear et al. | 403/267 |

*Primary Examiner*—Andrew V. Kundrat
*Attorney, Agent, or Firm*—Horst M. Kasper

[57] ABSTRACT

A force-transmitting, cone-shaped press-fit connection of metallic materials is provided between a shaft, an axle, or a pin and a hub, a disk, a wheel, or the like. An integral joint is formed with an anaerobic adhesive disposed in the residual roughness intermediate spaces of a joint slot adjoining a pressed-in conical seat having an oversize. The axial securing of the cone press-fit connection against loosening is performed predominantly via the integral joint formation.

30 Claims, 1 Drawing Sheet

FORCE-TRANSMITTING, CONE-SHAPED PRESS-FIT CONNECTION

BACKGROUND OF THE INVENTION

1. Field of the Invention

The invention relates to a force-transmitting, conical press-fit connection of metallic materials between a shaft, an axle, an arbor, a spindle, a roll, a roller, a capstan, a pin, a pivot, a journal, or a trunnion in connection with a driving collar, a boss, a hub, a nabe, a disk, a dial, a wheel, a washer, a pulley, a slice, a flange, a panel, a gear, an impeller, or a knurl.

2. Brief Description of the Background of the Invention Including Prior Art

Such a connection is known from the handbook "Maschinenelemente (Machine Elements)" of G. Niemann, Volume 1, 2nd Edition, page 361, Springer Publishing Co., Berlin, New York. The press force for pressing on the hub is furnished by a nut, which is screwed into a thread of the shaft and which nut protrudes interferingly such that the possibilities of application and use are substantially limited. Extensive requirements are to be met relating to the precision of this cone connection in order to allow a transfer of torque. Consequently, the connection is expensive and thus uneconomical for many application situations. Based on microvibrations and microslips, in case of a high dynamic, repetitive or alternating load, axially non-secured cone press-fit connections have the tendency to migrate axially, which results in the long run in an unintended loosening or slackening of the connection.

SUMMARY OF THE INVENTION

1. Purposes of the Invention

It is an object of the present invention to furnish a force-transmitting, conical press-fit connection or compression connection such that the production costs can be decreased and the application possibilities can be more varied.

It is a further object of the present invention to furnish a force-transmitting, conical press-fit connection, which avoids an unintended and undesired loosening and where, without precision machining requirements, the loadability, i.e. the fatigue strength and stability and the slide torque, are further increased.

It is yet a further object of the invention to provide a conical press-fit connection which entails low requirements regarding the precision of the surfaces to be engaged.

These and other objects and advantages of the present invention will become evident from the description which follows.

2. Brief Description of the Invention

The present invention provides for a force-transmitting, funnel-shaped press-fit connection. A shaft member of the press-fit connection has an outer rotation-symmetrical surface and forms thereby a rotation-symmetrical seat. A hub member has an inner rotation-symmetrical surface matched to the outer rotation-symmetrical surface of the shaft member. The hub member and the shaft member are placed into a mutually engaged position thereby forming an intermediate space of a joint slot. An anaerobic adhesive is disposed in the residual roughness present at the intermediate space of the joint slot adjoining the pressed-in rotation-symmetrical seat having an oversize. Thereby, an integral joint is formed between the shaft member and the hub member.

The shaft member and the hub member can be made of a metallic material.

The rotation-symmetrical surfaces can be of conical shape. The oversize of the conical longitudinal press-fit connection can amount to 0.05 to 5 per thousand of the average diameter prior to an axial joint fitting, without taking into consideration a film thickness of the adhesive. The rotation-symmetrical surfaces can be formed as frustrated cone faces. The tapers of the cone faces of the hub member and of the shaft member can be disposed between limiting values of from about 1:5 through 1:100, and preferably from about 1:20 and 1:50. At least one of the rotation-symmetrical surfaces can be roughened by sand blasting or ball-shooting hardening. An axial securing of the rotation-symmetrical press-fit connection against loosening can be performed predominantly via an integral joint formation.

The shaft member can be furnished with a pressure-means channel leading to the rotation-symmetrical surface.

An axial bore in the shaft member can have an opening at one longitudinal end on one side of the shaft member. A channel can run substantially in radial direction of the shaft member near the center of the funnel-shaped press-fit connection. The channel can be joined near an axis of the shaft member to the axial bore for allowing separation of the press-fit connection by application of fluid pressure through the radial channel. A compression coupling can be attached to the opening of the axial bore.

The adhesive can be a composition comprising a polyvinyl-chloride, a softener, and an adhesion promoter.

A method for producing a force-transmitting, funnel-shaped press-fit connection can comprise the following steps. A shaft member, having an outer rotation-symmetrical surface, is machined to form a rotation-symmetrical seat. A hub member, having an inner rotation-symmetrical surface matched to the outer rotation-symmetrical surface of the shaft member, is machined. An anaerobic adhesive is disposed on one of the rotation symmetrical surfaces. The hub member and the shaft member are placed into a mutually engaged position and form thereby an intermediate space of a joint slot. The hub member and the shaft member are pressed together in an axial direction and force thereby the anaerobic adhesive into the residual roughness, present at the intermediate space of the joint slot, adjoining the pressed-in rotation-symmetrical seat, having an oversize, thereby forming an integral joint between the shaft member and the hub member.

The shaft member and the hub member can be made of a metallic material. The shaft member can be oversized such that the oversize of the conical longitudinal press-fit connection amounts to 0.05 to 5 per thousand of the average diameter prior to the axial joint fitting, without taking into consideration the thickness of the adhesive film. The hub member and the shaft member can be machined for forming tapers of cone faces. The taper of the hub member and of the shaft member, respectively, can be disposed between limiting values of from about 1:5 through 1:100.

At least one of the rotation-symmetrical surfaces can be roughened by sand blasting or ball-shooting hardening. The taper of the cone face of the hub member and of the shaft member, respectively, can be from about 1:20 and 1:50. The rotation-symmetrical press-fit connection can be axially secured against loosening via formation of an integral joint.

A fluid pressure source can be attached to a compression coupling which can in turn be attached to an opening of a longitudinal bore of the shaft member. The shaft member can be furnished with a pressure-means channel leading to the rotation-symmetrical surface. A pressure means can be fed into an axial bore in the shaft member, having an opening at one longitudinal end on one side of the shaft member. From there, the pressure means can be fed into the pressure means channel, running substantially in radial direction of the shaft member near the center of the funnel-shaped press-fit connection and joined near the axis of the shaft to the axial bore. This can allow for separation of the press-fit connection by application of fluid pressure through the radial channel.

According to the invention, an integral joint between two conical faces is formed with an anaerobic adhesive, disposed in the residual roughness intermediate spaces of a jointing slot, defined by a pressed-in cone seat, where the cone seat exhibits a relative oversize.

Since only about 20 to 30% of the surface have metallic contact in case of a force-transmitting connection, independent of the roughness depth or peak-to-valley height, the liquid adhesive can fill the remaining 70 to 80% of the jointing face. After hardening, it can generate in this way a kind of immediate microform joint connection or an integral joint with a retention of self-substance. This microform joint connection can increase the continuous use lifetime and the stability under short-term heavy load of the shaft-hub connection by about 30 to 100%. A hydrostatic pressure is generated in the adhesive based on the axial jointing force in the free spaces filled with the adhesive in this microform joint connection, such that the adhesive is enclosed under a very high pressure and hardens. This results in an additional increase of the shearing strength and/or the resistance to flexing of the adhesive in addition to and to above the shearing strength or resistance to flexing under ambient air pressure indicated in the respective adhesive material data sheets. The cone press-fit connection hardens with an oversize. An oversize means that the outer diameter of the shaft at the considered position is larger than the inner diameter of the hub or the like, at a time while the hub is not pressed-on and where the hub is only placed under tension after pressing-on. The employed anaerobic adhesives are preferably single-component products, which harden in the jointing slot in the absence of oxygen while simultaneously having contact with the metal.

An anaerobic adhesive is an adhesive which hardens in the absence of oxygen. The adhesive employed is preferably an adhesive which does not contain any solvent prior to application or where the solvent is already evaporated prior to the adhesion process. Examples for such adhesives include "Plastisol-Kleber" comprising a polyvinyl chloride, a softener, and an adhesion promoter. Adhesives, based on solutions or dispersions, can comprise polyurethane, vinyl acetate, vinyl chloride, and vinyl dichloride copolymers, where metals are to be joined. The solvent or dispersant evaporates prior to gluing. Alternatively, reaction adhesives can be employed for the attachment of metals, ceramic, and plastics. Such reaction adhesives can be produced from epichlorohydrine derivatives and acid anhydrides, epichlorohydrine and polyamines, of polyisocyanates and polyols, of cyanoacrylates, and of methacrylates. Alternatively, urethane polymers and styrene or methacrylates can be used to attach metals, plastics, and/or ceramic to obtain the integral joint. The materials employed can be cold-application adhesives, and warm-application adhesives.

The hardening is performed in most cases, as usual, at room temperature but the hardening can be accelerated by increased temperature. Anaerobic adhesives have the property that they harden already in part during the jointing operation such that the nut, employed in the conventional technology, or other tension devices or, respectively, a longer residing and curing under a press, are no longer required. The reaction speed is inversely proportional to the thickness of the adhesive layer, and the thickness of the adhesive layer is extremely thin based on the build-up of the hydrostatic pressure. An undesired resilience, rebounding, or recoiling of the connection is thus prevented.

The invention provides an additional, essential advantage in that the jointing parts can be produced by an economic milling and processing with a relatively high surface roughness and angle tolerance, since the hardened adhesive can balance out tolerances in the region of one or several tenths of millimeters. The "IT quality 9" is sufficient for a production of the respective conical jointing partner.

Depending on the kind of adhesive employed, the shearing strength of the adhesive reaches after ten hours already about 4,500 to 6,000 $N/cm^2$. Thus, the connection with more than 25,000 $N/cm^2$ reaches nearly the oscillation strength $T_w$ with alternating torsion load at about $3 \cdot 10^6$ load changes of the full shaft, which is, for example, 30,000 $N/cm^2$ for the alloy 34 chromium-nickel-molybdenum-6 (34 CrNiMo6). The conical, immediate and integrally jointed longitudinal press-fit connection exceeds in its torsion loadability the conventional conical longitudinal press-fit connection by about 30 to 100%. The invention connection offers the advantage of a more economic production based on the higher permissible processing and milling tolerances. In addition, said press-fit connection furnishes the advantage of being loadable in radial direction up to the flow limit of the metallic materials and in axial direction up to the shearing strength of the adhesive.

According to a further embodiment of the invention, the oversize of the conical longitudinal press-fit connection amounts after the axial jointing to 0.05 to 5.0 per thousand of the average diameter without taking into consideration the adhesive film. The taper of the cone of the hub and of the shaft is within the limits of from about 1:5 to 1:100, and preferably between 1:20 and 1:50. The cone taper of 1:20 results, in case of an average cone diameter of 40 mm, in a jointing path of about 2 mm, which is reached in a very short press-in time. The shorter the jointing time, the smaller are the jointing forces, since the reaction of the anaerobic adhesive starts instantaneously. In addition, a desired diameter coverage of from 1 to 2 per thousand in case of this cone angle is reached without excessive force requirements. In case of cone slopes of up to 1:100, there exists also no danger of a stripping off of the adhesive during the jointing process, such that a joint connection is achieved which is secure even in an assembly-line production.

According to a further embodiment of the invention, at least one of the adhesive surfaces can be roughened based on sand blasting, shot peening, ball-shooting hardening, and shot blasting. The adhesion of the gluing nests, pockets, or clusters is thereby improved and the loadability of the joint with forces and torques can be further increased. The axial securing of the conical press connection against loosening is performed predominantly via the integral joint. Furthermore, the shaft or the like can have a pressure-means channel leading to the adhesive surface. An oil pressure can be built up in the pressure-means channel for loosening the joint connection. No additional pull-off devices are required, since the cone moves by itself in axial direction in case a corresponding oil pressure is applied through the pressure-means channel.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

Figure 1:
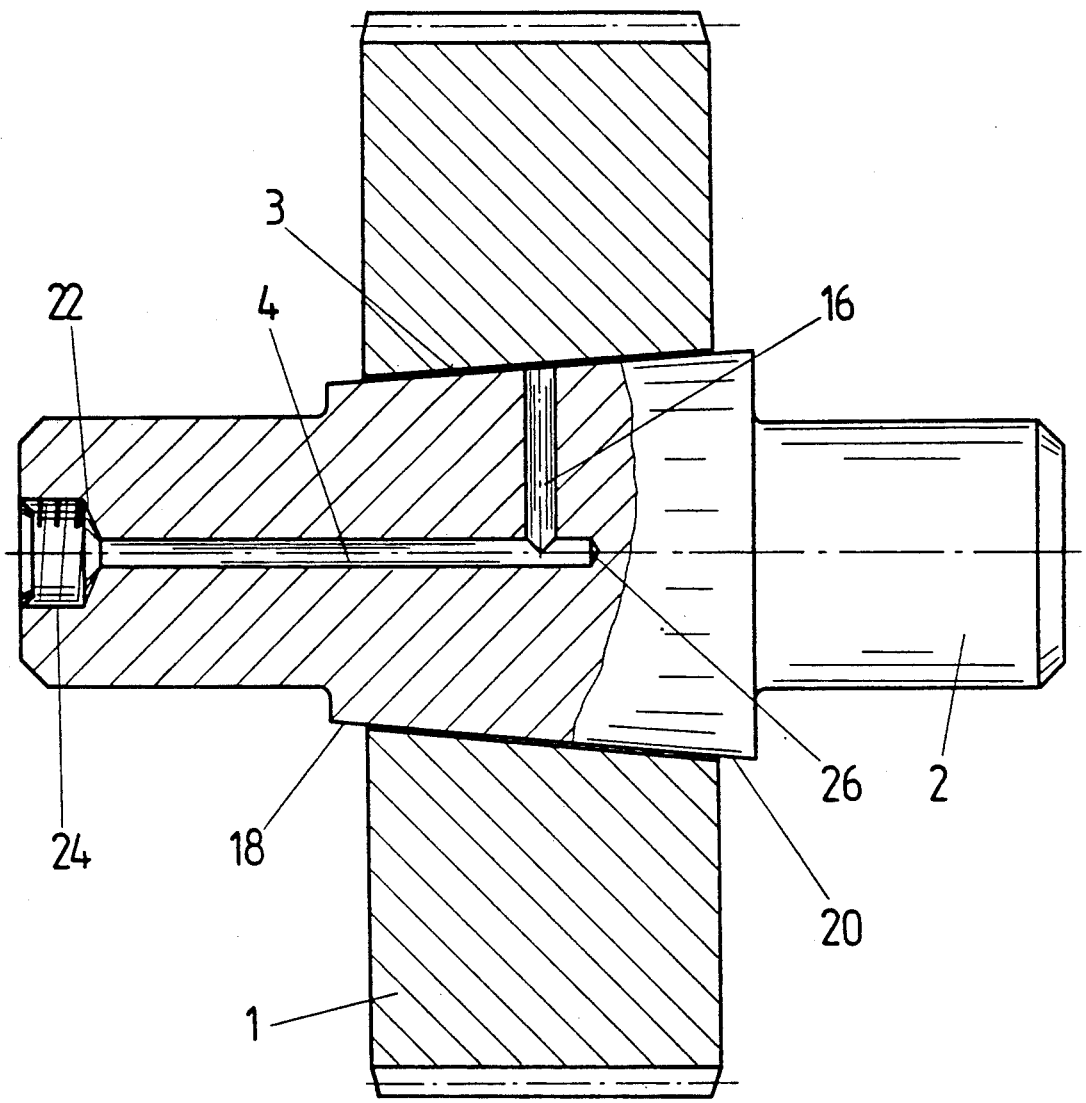
FIG. 1 is a partially sectional view of a schematic representation of a tapered cone joint.

In accordance with the present invention, there is provided for a force-transmitting, cone-shaped press-fit connection of metallic materials between a shaft, an axle, or a pin and a hub, a disk, a wheel, or the like. An integral joint is formed with an anaerobic adhesive disposed in the residual roughness intermediate spaces of a joint slot adjoining a pressed-in cone seat having an oversize.

The oversize of the conical longitudinal press-fit connection can amount to 0.05 to 5 per thousand of the average diameter prior to the axial joint fitting, without taking into consideration the thickness of the adhesive film.

The taper of the cone of the hub 1 and of the shaft 2 can be disposed between the limits of from about 1:5 through 1:100, and preferably between the limits of from about 1:20 and 1:50.

At least one of the cone faces can be roughened by sand blasting or ball-shooting hardening.

The axial securing of the cone press-fit connection against loosening can be performed predominantly via the integral joint formation.

The shaft 2 can be furnished with a pressure-means channel 4 leading to the adhesion face 3.

According to the embodiment of this invention illustrated in FIG. 1, the scale of a junction suitable for practical application is 1:1. However, for representation and recognition purposes, the illustration of the slope and taper of the cone is enlarged by a ratio of 1:10, since the desired taper of the cone, amounting to 1:50, would hardly be recognizable from such a drawing.

A hub 1, furnished with an outer interlocking and/or denticulation, is attached with a cone-shaped adhesion face 3 to the shaft 2. The shaft 2 is furnished with a pressure-means channel 4 leading to the adhesion face 3. The adhesion slot is illustrated at an enlarged scale and symbolizes the engaging surface roughness formed by peaks and valleys with included adhesive parts. The adhesive is applied to the previously cleaned adhesion faces 3 in a quantity sufficient to form a strong joint, such that a formation of air inclusions is avoided. After the axial pressing-in onto the desired oversize, taking only fractions of a second, the parts are jointed to a self-securing unit, which can only be loosened again with force.

The conical face of the shaft is preferably extending beyond the conical faces of the hub on each side in the area of reference numerals 18 and 20 by an amount of from about 0.05 to 0.2 of the thickness of the hub in the area of the joint, and preferably by from about 0.08 to 0.15 of the thickness of the hub. A channel 16 in the shaft 2 for loosening of the joint is directed radially and intersecting about the center plane of the hub. The radial channel 16 is followed by an axial channel 4 in the shaft 2, where the axial channel 4 is connected to the radial channel 16 and has one end 26 closed off. The second end of the axial channel 4 of the shaft ends in a conical pressure-fit surface 22 followed by a guide surface 24. The conical pressure-fit surface 22 and the guide surface 24 allow the attachment of a pipe via a pressure fitting for feeding pressure medium into the axial channel 4. The thickness of the hub can be preferably from about 0.5 to 2.0 times the diameter of the shaft. Preferably, the thickness of the shaft at its outer extensions is smaller than the diameter of the frustum conical faces of the shaft 2 for engaging the hub 1.

It will be understood that each of the elements described above, or two or more together, may also find a useful application in other types of press-fit connections differing from the types described above.

While the invention has been illustrated and described as embodied in the context of a force-transmitting, cone-shaped press-fit connection, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A force-transmitting, funnel-shaped press-fit connection comprising
   a shaft member having an outer conical rotation-symmetrical surface, thus forming a rotation-symmetrical seat;
   a hub member having an inner conical rotation-symmetrical surface matched to the outer rotation-symmetrical surface of the shaft member, wherein the hub member and the shaft member are placed into a mutually engaged position thereby forming an intermediate space of a joint slot;
   an anaerobic adhesive disposed in residual roughness present at the intermediate space of the joint slot adjoining the pressed-in rotation-symmetrical seat having an oversize thereby forming an integral joint between the shaft member and the hub member.

2. The force-transmitting, funnel-shaped press-fit connection according to claim 1, wherein the shaft member and the hub member are made of a metallic material.

3. The force-transmitting, funnel-shaped press-fit connection according to claim 1, wherein
the rotation-symmetrical surfaces are of conical shape, and
wherein the oversize of the conical longitudinal press-fit connection amounts to 0.05 to 5 per thousand of the average diameter prior to an axial joint fitting, without taking into consideration a film thickness of the adhesive.

4. The force-transmitting, funnel-shaped press-fit connection according to claim 1, wherein
the rotation-symmetrical surfaces are formed as frustrated cone faces, and wherein tapers of the cone faces of the hub member and of the shaft member are disposed between limiting values of from about 1:5 through 1:100.

5. The force-transmitting, funnel-shaped press-fit connection according to claim 4, wherein
the taper of the cone faces of the hub member and of the shaft member is from about 1:20 and 1:50.

6. The force-transmitting, funnel-shaped press-fit connection according to claim 1, wherein
at least one of the rotation-symmetrical surfaces is roughened by sand blasting or ball-shooting hardening.

7. The force-transmitting, funnel-shaped press-fit connection according to claim 1, wherein
an axial securing of the rotation-symmetrical press-fit connection against loosening is performed predominantly via an integral joint formation.

8. The force-transmitting, funnel-shaped press-fit connection according to claim 1, wherein
the shaft member is furnished with a pressure-means channel leading to the rotation-symmetrical surface.

9. The force-transmitting, funnel-shaped press-fit connection according to claim 1, further comprising
an axial bore in the shaft member having an opening at one longitudinal end on one side of the shaft member;
a channel running substantially in radial direction of the shaft member near the center of the funnel-shaped press-fit connection and joined near an axis of the shaft member to the axial bore for allowing separation of the press-fit connection by application of fluid pressure through the radial channel; and
a compression coupling attached to the opening of the axial bore.

10. The force-transmitting, funnel-shaped press-fit connection according to claim 1, wherein
the adhesive is a composition comprising a polyvinylchloride, a softener, and an adhesion promoter.

11. A force-transmitting, cone-shaped press-fit connection of metallic materials between a shaft, an axle, or a pin and a hub, a disk, a wheel, or the like, wherein an integral joint is formed with an anaerobic adhesive disposed in residual roughness intermediate spaces of a joint slot adjoining a pressed-in cone seat having an oversize.

12. The force-transmitting, cone-shaped press-fit connection according to claim 1, wherein
the oversize of the conical longitudinal press fit connection amounts to 0.05 to 5 per thousand of the average diameter prior to the axial joint fitting, without taking into consideration the thickness of the adhesive film.

13. The force-transmitting, cone-shaped press-fit connection according to claim 1, wherein
the taper of the cone of the hub (1) and of the shaft (2) is disposed between the limits of from about 1:5 through 1:100.

14. The force-transmitting, cone-shaped press-fit connection according to claim 3, wherein
the taper of the cone of the hub (1) and of the shaft (2) is from about 1:20 and 1:50.

15. The force-transmitting, cone-shaped press-fit connection according to claim 1, wherein
at least one of the cone faces is roughened by sand blasting or ball-shooting hardening.

16. The force-transmitting, cone-shaped press-fit connection according to claim 1, wherein
the axial securing of the cone press-fit connection against loosening is performed predominantly via the integral joint formation.

17. The force-transmitting, cone-shaped press-fit connection according to claim 1, wherein
the shaft (2) is furnished with a pressure-means channel (4) leading to the adhesion face (3).

18. A method for producing a force-transmitting, funnel-shaped press-fit connection comprising
machining a shaft member having an outer rotation-symmetrical conical surface thus forming a rotation-symmetrical seat;
machining a hub member having an inner rotation-symmetrical conical surface matched to the outer rotation-symmetrical surface of the shaft member;
disposing an anaerobic adhesive on one of the rotation symmetrical surfaces;
placing the hub member and the shaft member into a mutually engaged position thereby forming an intermediate space of a joint slot;
pressing the hub member and the shaft member together in an axial direction thereby forcing the anaerobic adhesive into residual roughness present at the intermediate space of the joint slot adjoining the pressed-in rotation-symmetrical seat having an oversize thereby forming an integral joint between the shaft member and the hub member.

19. The method for producing a force-transmitting, funnel-shaped press-fit connection according to claim 18 further comprising
making the shaft member of a metallic material; making the hub member of a metallic material;
oversizing the shaft member such that the oversize of the conical longitudinal press-fit connection amounts to 0.05 to 5 per thousand of the average diameter prior to the axial joint fitting, without taking into consideration the thickness of an adhesive film;
machining the hub member for forming a taper of a cone face; machining the shaft member for forming a taper of a cone face, wherein the taper of the hub member and of the shaft member is disposed between limiting values of from about 1:5 through 1:100.

20. The method for producing a force-transmitting, funnel-shaped press-fit connection according to claim 18 further comprising
roughening at least one of the rotation-symmetrical surfaces by sand blasting or ball-shooting hardening, wherein the taper of the cone face of the hub member and of the shaft member is from about 1:20 and 1:50;

securing the rotation-symmetrical press-fit connection axially against loosening via formation of an integral joint.

21. The method for producing a force-transmitting, funnel-shaped press-fit connection according to claim 18 further comprising attaching a fluid pressure source to a compression coupling attached to an opening of a longitudinal bore of the shaft member;

furnishing the shaft member with a pressure-means channel leading to the rotation-symmetrical surface;

feeding a pressure means into an axial bore in the shaft member having an opening at one longitudinal end on one side of the shaft member and from there into the pressure means channel running substantially in radial direction of the shaft member near the center of the funnel-shaped press-fit connection and joined near the axis of the shaft to the axial bore for allowing separation of the press-fit connection by application of fluid pressure through the radial channel.

22. The force-transmitting, funnel-shaped press-fit connection according to claim 1, wherein the shearing strength of the adhesive is in excess of 4,500 N/cm$^2$.

23. The force-transmitting, funnel-shaped press-fit connection according to claim 1, wherein one of the surfaces covered with adhesive is roughened based on a process selected from the group consisting of sand blasting, shot peening, ball-shooting hardening, and shot blasting.

24. The force-transmitting, funnel-shaped press-fit connection according to claim 1, wherein the shearing strength of the anaerobic adhesive is in excess of 4,500 N/cm$^2$.

25. The force-transmitting, funnel-shaped press-fit connection according to claim 1, wherein the adhesive comprises a member selected from the group selected of polyurethane, vinyl acetate, copolymer, vinyl chloride copolymer, vinyl dichloride copolymers and mixtures thereof.

26. The force-transmitting, funnel-shaped press-fit connection according to claim 1, wherein the adhesive comprises a member selected from the group consisting of epichlorohydrine derivatives of acid anhydrides, epichlorohydrine and polyamines, polyisocyanates, and polyols, cyanoacrylates, methacrylates.

27. The force-transmitting, funnel-shaped press-fit connection according to claim 1, wherein the anaerobic adhesive fills 70 to 80% of the intermediate space of the joint slot.

28. The force-transmitting, funnel-shaped press-fit connection according to claim 1, wherein the anaerobic adhesive forms an integral joint connection with retention of self-substance.

29. The force-transmitting, funnel-shaped press-fit connection according to claim 1, wherein the anaerobic adhesive forms an immediate microform joint connection increasing the continuous use lifetime and the stability under short-term heavy load of a shaft member-hub member connection by about 30 to 100%.

30. The force-transmitting, funnels-shaped press-fit connection according to claim 1, wherein a hydrostatic pressure is generated in the adhesive based on an axial joining force in the intermediate space of the joint slot filled with the anaerobic adhesive, and wherein the anaerobic adhesive is enclosed under a very high pressure, and wherein the anaerobic adhesive is hardened for providing an additional increase of a shearing strength and of a resistance to flexing in addition to a shearing strength and resistance to flexing under ambient air pressure.

* * * * *